United States Patent [19]
Whitehead

[11] Patent Number: 4,596,523
[45] Date of Patent: Jun. 24, 1986

[54] CALENDAR OR ROLL ASSEMBLY

[76] Inventor: Fred Whitehead, 43 Meadowside, Lancaster, LA1 3AQ, England

[21] Appl. No.: 750,924

[22] Filed: Jul. 1, 1985

[30] Foreign Application Priority Data

Jul. 4, 1984 [GB] United Kingdom ............... 8417066

[51] Int. Cl.⁴ .................. B29C 15/00; B29D 7/14
[52] U.S. Cl. ................................. 425/367; 425/363
[58] Field of Search ................... 425/363, 366, 367

[56] References Cited

U.S. PATENT DOCUMENTS

| | | | |
|---|---|---|---|
| 2,575,590 | 11/1951 | Goulding | 425/363 X |
| 2,611,150 | 9/1952 | Goulding | 425/367 X |
| 2,732,591 | 1/1956 | Whittum | 425/363 X |
| 2,897,538 | 8/1959 | Shapiro et al. | 425/367 X |
| 3,060,843 | 10/1962 | Moore et al. | 425/363 X |
| 3,129,457 | 4/1964 | Carter et al. | 425/367 X |
| 3,273,199 | 9/1966 | Kleinewefers | 425/367 X |
| 3,274,308 | 9/1966 | Freeman et al. | 425/367 X |
| 3,679,344 | 7/1972 | Balint | 425/366 |
| 3,871,808 | 3/1975 | Anker | 425/367 |
| 4,038,012 | 7/1977 | Sander | 425/367 X |
| 4,117,054 | 9/1978 | Salo | 425/367 X |
| 4,124,349 | 11/1978 | Lehmann | 425/367 |
| 4,171,942 | 10/1979 | Missenard | 425/367 |

Primary Examiner—J. Howard Flint, Jr.
Attorney, Agent, or Firm—Ross, Ross & Flavin

[57] ABSTRACT

A calendar assembly for making a substantially uniform thickness web in large widths with rolls having adjustable axis. The upper roll has an axis adjustable in a plane which is parallel to but offset from a plane in which the lower roll is adjustable. The axis of a third or intermediate roll in the stack is transversely adjustable between the upper and lower rolls.

5 Claims, 9 Drawing Figures

4,596,523

CALENDAR OR ROLL ASSEMBLY

This invention relates to a calender or roll assembly for production of a film or sheet, e.g. of elastomeric or plastics material, of substantially uniform thickness.

The calendering process is well known in the art and consists of a continuous process whereby a film or sheet is formed from a heat-softened thermoplastic mass by squeezing said mass between one or more generally parallel pairs of rolls. Nowadays, users of plastics films and sheets demand a high degree of uniformity of thickness to facilitate automation of their handling processes. The degree of uniformity of thickness achieved by the calendering process is, at the present time, greater than that achieved by any other process of film or sheet production, such as extrusion or casting. However, this high precision is currently only attained at the expense of versatility.

Each calender or roll assembly is designed to produce a web of substantially uniform cross-width thickness for only a few materials of similar melt viscosity, and for only a small range of thicknesses, roll speeds and roll temperatures. If such a calender is used to process different material and/or the other parameters are varied, significant variation of thickness occurs across the width of the web. It is therefore common practice to distinquish between calenders for films (2 to 10 mm thick), calenders for sheeting (10 to 40 mm thick), calenders for rigid polyvinylchloride (PVC) and calenders for plasticized PVC etc.

In view of the present day cost of setting up and running a calender or roll assembly for production of films or sheets, the aforesaid limitation in its use is extremely disadvantageous. Whilst there have been proposals in the past to extend the range of operation of a calender or roll assembly, it is an object of the present invention to provide an improved arrangement whereby the range of operation is significantly enhanced so that a single calender or roll assembly can produce a wide range of uniform film or sheet thicknesses from a variety of elastomeric or plastics materials of varying viscosities.

Pursuant hereto the present invention provides a calender or roll assembly for production of a film or sheet of substantially uniform thickness comprising a stack of at least three rolls, namely a central roll disposed between a first roll and a second roll so as to provide respective nips between the first roll and the central roll and between the central roll and the second roll, wherein the axis of the first roll is adjustable transversely of its length in a first plane and the axis of the second roll is adjustable transversely of its length in a second plane which is substantially parallel to but offset from the first plane, and wherein the axis of the central roll is transversely adjustable between the first plane and the second plane.

Usually the stack is generally vertically arranged so that the first roll is an upper roll and the second roll is a lower roll and the planes in which these are adjustable are parallel vertical planes.

The axis of the central roll may move perpendicularly between the first and second planes. Alternatively, it may follow a bowed path corresponding to the arc of the first or second rolls. It should, however, be noted that it is not essential for the axis of the central roll to remain parallel with the axes of the first and second rolls. The ends of the central roll axis may move to different extents to give a certain degree of roll crossing so as to compensate for certain roll shape errors which may arise.

The range of film or sheet thickness which can be produced by the calender or roll assembly may be modified further by crowning one or more of the rolls in conventional manner.

The problem of calender versatility and the solution proposed by the present invention will be described further with reference to the accompanying drawings, in which.

Figure 1:
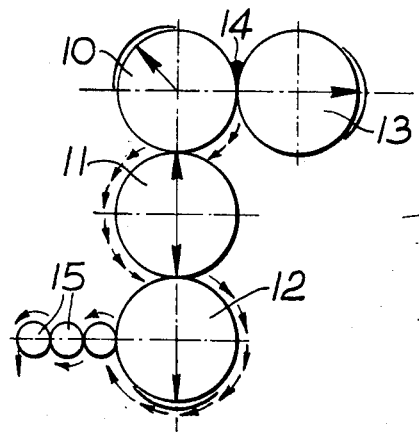
FIG. 1 is a schematic end view of a conventional calender stack illustrating the separating forces which arise during operation.
Figure 2:
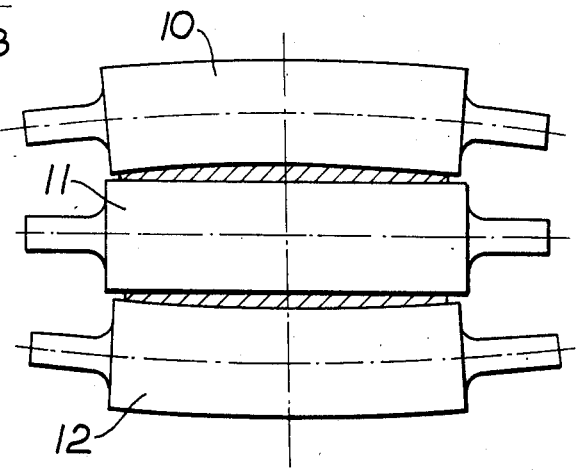
FIG. 2 is a schematic front view of the stack of FIG. 1 illustrating the deflection of the upper and lower rolls during operation in exaggerated manner.

FIGS. 1 and 2 show a convential calender or roll assembly comprising three vertically aligned rolls, namely an upper roll 10, a central roll 11 and a lower roll 12, with respective nips therebetween, and a second upper roll 13 which has its axis on the same level as the roll 10 and forms a nip therewith. In the calendering process, a heat softened doughlike mass 14 of elastomeric or plastics material is fed from above the nip between the upper rolls 10, 13 and is squeezed into the form of a thin web, i.e. a film or sheet, by passing successively through the nip between the rolls 10, 13 through the nip between the rolls 10 and 11, around the roll 11 and finally through the nip between rolls 11 and 12, as indicated in FIG. 1. The web then passes around the lower roll 12 to a series of horizontally aligned auxiliary rolls 15.

During processing transverse thickness variations in the web arise due to deflection of the rolls 10, 12, 13 by the roll separating forces generated at the respective nips. The lower roll 12 tends to deflect downwards due to nip pressure relative to the central roll 11 and the upper roll 10 tends to deflect upwardly and forwardly due to nip pressure relative to both the rolls 11 and 13. The forces are illustrated diagrammatically in FIG. 1 and the resultant deflection is shown in FIG. 2.

Figure 5:
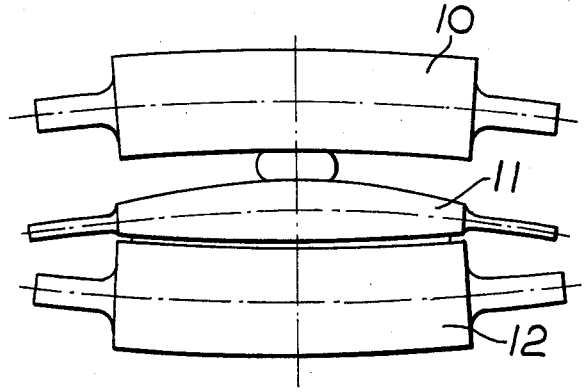
FIG. 5 is a schematic front view of a conventional stack with the central roll crowned so as to compensate for roll deflection.

It is well known to compensate for the deflections by crowning at least one roll in the vertical stack, that is to say by giving it a slightly convex surface contour. In FIG. 5 the central roll 11 is shown crowned, but often the lower roll 12, or both the lower roll 12 and the central roll 11 are crowned. The particular degree of crowning is calculated to compensate for the roll deflection caused by nip pressure for a material having a known melt viscosity which is calendered at a specific temperature, speed and final thickness. In other words, each crown is only capable of providing accurate correction under a given set of conditions. In practice, it is usually possible to obtain reasonably uniform transverse web thickness for a narrow range of web thicknesses of a particular material provided that the roll speed and temperature are appropriately adjusted. Nevertheless, the problem of roll deflection severely limits the use of a given calender to a very narrow range of melt viscosities and web thicknesses.

A change from one type of product to another e.g. to a material of a quite different melt viscosity or a web of substantially different thickness requires costly and time-comsuming changes to the basic roll crowns, by grinding the roll or rolls to the desired new crown or by replacement of the crowned roll or rolls, both of which are costly in view of the size of the calender rolls and the necessary accuracy of crowning.

Figure 3:
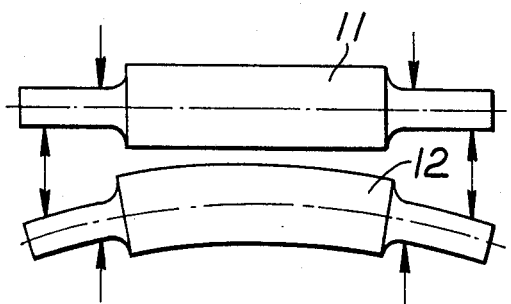
FIG. 3 is a schematic front view of a pair of adjacent rolls in a conventional stack illustrating compensation for roll deflection by bending of the rolls.
Figure 4:
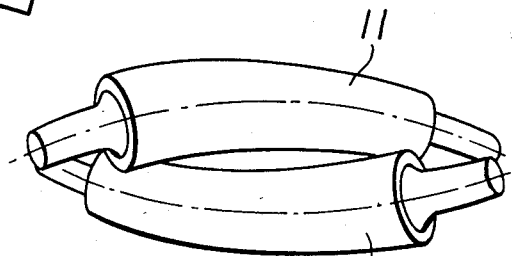
FIG. 4 is a schematic perspective view of a pair of adjacent rolls in a conventional stack illustrating compensation for roll deflection by crossing the axes of one of the rolls relative to the other.

Two methods are used commercially to slightly extend the range of melt viscosities and web thicknesses which can be dealt with by a particular calender, and also to compensate for the crowning where the other conditions are not as desired. These methods are "roll bending" and "roll crossing" and they are illustrated in FIGS. 3 and 4 respectively. Roll bending involves application of bending forces to a pair of auxiliary bearings located at the ends of the roll outside the regular bearings. This is usually applied to the lower roll 12, but sometimes also the central roll 11. Roll crossing consists of deliberate misalignment of the axis of one of the two lowermost rolls, i.e. the central roll 11 and the lower roll 12. This increases roll clearance at the ends, while maintaining the clearance at the centre. Both of these methods have mechanical limitations.

Figure 6:
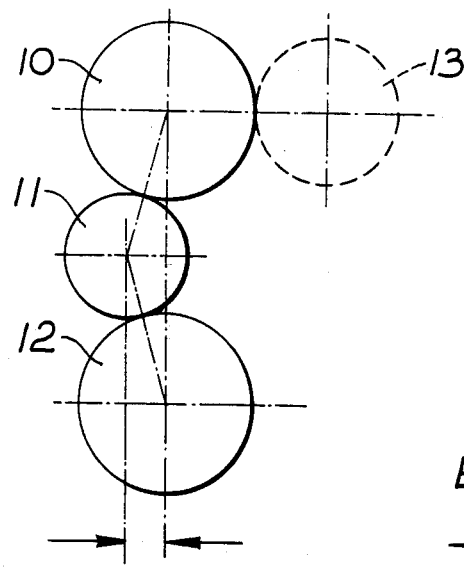
FIG. 6 is a schematic end view of a previous proposal for lateral adjustment of the central roll.

FIG. 6 illustrates a recent proposal, as set forth in British Patent Specification No. 1573932, for increasing the range of melt viscosities and web thicknesses which can be handled by a given calender. In accordance with this proposal, at least one roll is crowned and at least one roll usually the central roll 11, as illustrated, is displaceable outwardly of the vertical stack in one direction. Such lateral displacement (in each case by a pre-determined distance) compensates for excess crowning of the displaceable roll or an adjacent roll wherever the operating conditions (melt viscosity, web thickness, roll temperature and roll speed) are such that less deflection compensation is required than that provided by the crowning.

The present invention provides a new calender roll arrangement whereby a greater range of melt viscosities and web thicknesses than hitherto can be handled by a given calender.

Figure 7:
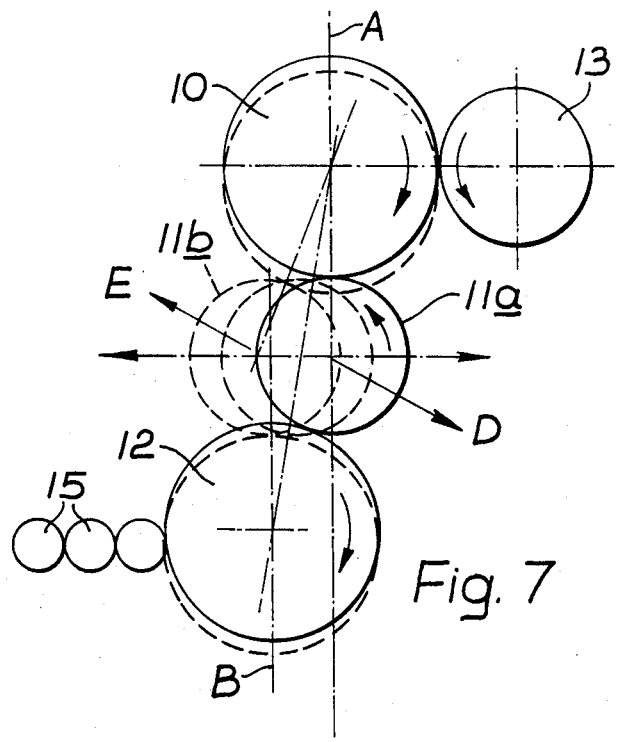
FIG.7 is a schematic end view of a simple practical embodiment of the calender or roll assembly in accordance with the present invention.

One example of the proposed arrangement is illustrated in FIG. 7. It will be noted that in contrast to conventional stacks, the axes of the upper and lower rolls 10, 12 are not adjustable on a common vertical plane. The axis of the upper roll 10 is adjustable transversely of its length in a first imaginary vertical plane A which is offset from a second imaginary vertical plane B in which the axis of the lower roll 12 is adjustable transversely of its length. These adjustments are indicated in FIG. 7 by broken lines.

The axis of the central roll 11 is movable transversely between a first limiting position 11a in which its axis lies on the first vertical plane A and a second limiting position 11b in which its axis lies in the second vertical plane B. The central roll 11 is adjustable between these two limiting positions 11a, 11b. As can be seen, in the first limiting position 11a the central roll 11 lies immediately below the upper roll 10. The resultant pressure from both upper and lower nips then tends to deflect the central roll 11 downwardly and to the right as indicated in FIG. 7 by the arrow D. Conversely, in the second limiting position 11b, the central roll 11 lies immediately above the lower roll 12 and the resultant pressure from the two nips tends to deflect the central roll 11 upwardly and to the left as indicated by the arrow E.

Displacement of the central roll 11 will be brought about by a computer controlled mechanism. At the same time both the upper and lower rolls 10, 12 will be vertically adjusted so as to form an appropriate nip with the central roll 11 in the selected position at either limiting position 11a or 11b or therebetween. The central roll 11 is not necessarily movable in a horizontal plane and may move in a bowed path corresponding to the arc of the upper or lower roll 10, 12. Moreover, the axis of the central roll 11 does not necessarily remain parallel to the axes of the upper and lower rolls 10, 12. The ends of the central roll 11 axis may move to different extents provided that neither end extends beyond the plane A or the plane B. This gives a certain degree of roll crossing so as to compensate for certain roll shape errors which may occur.

Although in the illustrated example (FIG. 7) the stack is arranged generally vertically with an upper roll, a central roll and a lower roll, the upper roll and the lower roll being adjustable in offset vertical planes, it must be understood that the invention is of wider application and that the stack can be orientated in any manner. For example, in an extreme case the stack may be arranged generally horizontally such that the central roll is disposed between and forms a nip with a first roll and a second roll, one at either side of the central roll. The only requirements are that the planes of adjustment of the first and second rolls are parallel or almost so and offset and that the central roll axis is adjustable only between these planes (and does not extend therebeyond).

Figure 8:
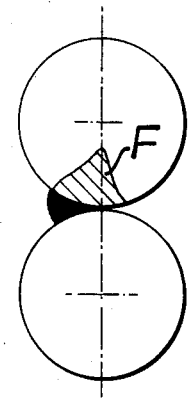
FIGS. 8 and 9 are schematic end views of the ultimate roll pair in a calender stack illustrating the difference in nip pressure when a roll of smaller diameter is used compared to that when two rolls of large diameter are used.
Figure 9:
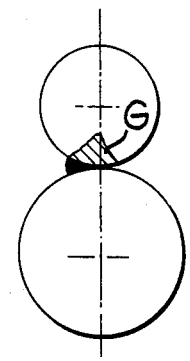

In accordance with the invention, the central roll is advantageously of smaller diameter than the first and second (or upper and lower) rolls. This is of particular importance. When a nip is formed between a smaller roll and a larger roll, the nip pressure when material passes therebetween is reduced compared to the nip pressure when material passes between two rolls both having the diameter of the larger roll since in the former case only a narrower bank of material can be accommodated at the input side of the nip. This is illustrated in FIGS. 8 and 9, nip pressure being indicated graphically at F and G.

Accordingly, use of a central roll which is smaller in diameter than the outer two rolls leads to an overall lower nip pressure on those two outer rolls than with a central roll of the same diameter as the outer rolls. Moreover, for a given pressure, the smaller central roll, now that it is permitted to deflect by virtue of its displacement, will deflect more than a larger central roll and will thus more readily compensate for the deflections of the outer rolls. The distance required between the parallel adjustment planes of the outer rolls is, of course, reduced for a central roll of smaller diameter compared to one of larger diameter (i.e. of similar diameter to the outer rolls).

A further advantage of using a smaller central roll is that, because of the reduced nip pressures explained above, the energy required to drive all the rolls in the calender stack is reduced, thus leading to considerable savings.

With the arrangement of the invention the range of melt viscosities and web thicknesses which can be handled by a particular calender while maintaining substantially uniform web thickness is greatly increased compared to previously known calenders. An increased range is possible without the need for roll crowning, roll bending or roll crossing, all of which are complex and costly. However, as mentioned roll crossing may be employed to a limited extent. Also crowning of one or more rolls used in the proposed roll assembly can lead to a change in the range of materials and thicknesses which can be dealt with by this assembly.

It should, of course, be appreciated that the calender or roll assembly as proposed herein is not limited to use with plastics or elastomeric material. It can also be used in paper production or indeed production of any type of thin film or sheeting requiring a high degree of accuracy and uniformity in transverse thickness.

I claim:

1. A calender or roll assembly for production of a film or sheet of substantially uniform thickness comprising a stack of at least three rolls, namely a central roll disposed between a first roll and a second roll so as to provide respective nips between the first roll and the central roll and between the central roll and the second roll, wherein the axis of the first roll is adjustable transversely of its length in a first plane and the axis of the second roll is adjustable transversely of its length in a second plane which is substantially parallel to but offset from the first plane, and wherein the axis of the central roll is transversely adjustable between the first plane and the second plane.

2. A calender or roll assembly as claimed in claim 1 wherein the central roll is smaller in diameter than the first and second rolls.

3. A calender or roll assembly for production of a film or sheet of substantially uniform thickness comprising a stack of at least three rolls, namely a central roll disposed between an upper roll and lower roll so as to provide respective nips between the upper roll and the central roll and between the central roll and the lower roll, wherein the axis of the upper roll is adjustable transversely of its length in a first imaginary vertical plane and the axis of the lower roll is adjustable transversely of its length in a second imaginary vertical plane which is offset from the first plane, and wherein the central roll is transversely adjustable between a first limiting position in which its axis lies on the first vertical plane and a second limiting position in which its axis lies on the second vertical plane.

4. A calender or roll assembly as claimed in claim 3 wherein the central roll is smaller in diameter than the upper and lower rolls.

5. A calender or roll assembly as claimed in any preceding claim wherein one of the three rolls is crowned.

* * * * *